April 24, 1956     G. W. C. SOMMERHOFF     2,742,735
STEERING DEVICE FOR MODEL BOAT OR VEHICLE
Filed March 8, 1955
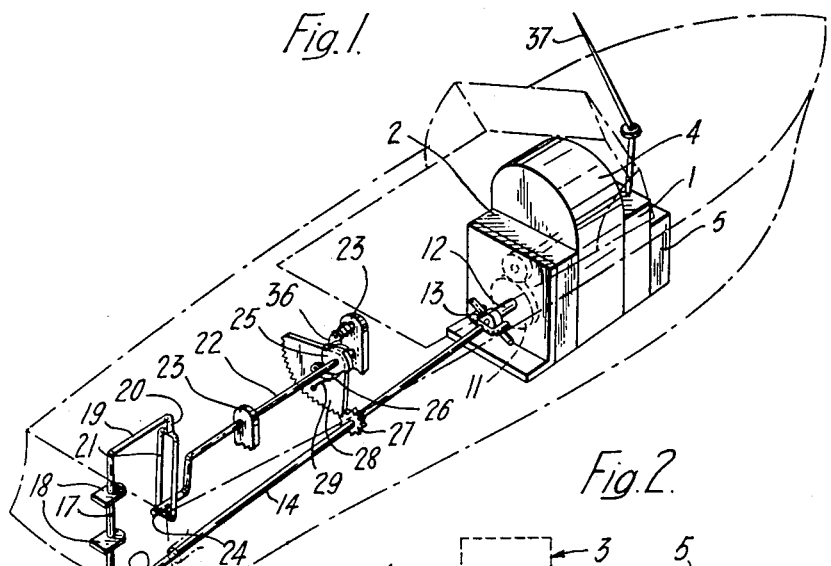
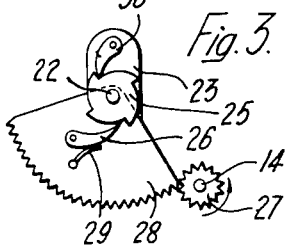
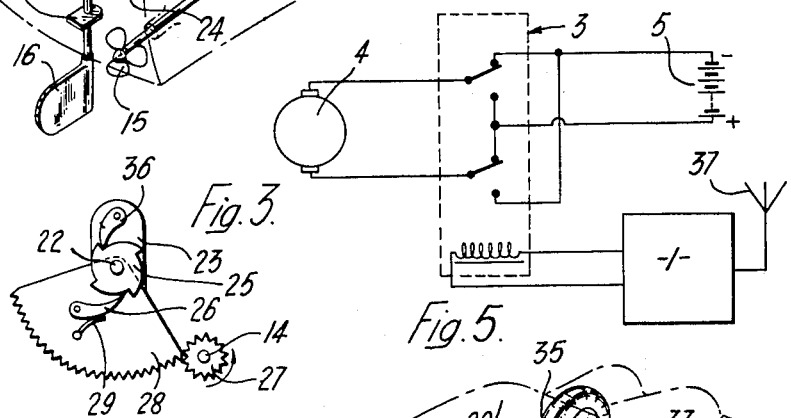
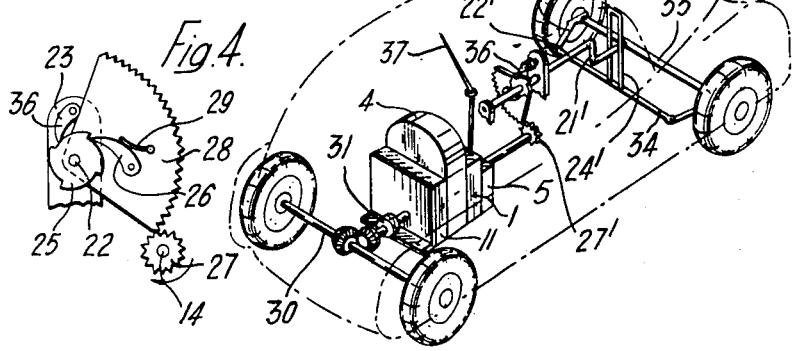
Inventor
GERD WALTER CHRISTIAN SOMMERHOFF
By Larson and Whiting   Attorney

United States Patent Office 2,742,735
Patented Apr. 24, 1956

2,742,735

STEERING DEVICE FOR MODEL BOAT OR VEHICLE

Gerd W. C. Sommerhoff, Oxford, England, assignor to Lines Bros. Limited, London, England, a British company Application March 8, 1955, Serial No. 492,928

Claims priority, application Great Britain March 12, 1954

5 Claims. (Cl. 46—244)

This invention relates to model boats or vehicles driven by reversible electric motors, the direction of rotation of the driving motor being controlled by radio.

An object of this invention is to enable the position of the rudder of a model boat or the steering axle of a model vehicle to be controlled by radio.

Another object is to provide a mechanism by which the steering device of a model boat or aircraft is operated from the driving shaft under radio control.

In this invention the angular position of the steering device, that is to say, the rudder of a boat or the steering axle of a vehicle, is controlled from the driving shaft, and a mechanism is provided whereby the steering device is moved through a predetermined angle each time the shaft is reversed for a short period, say one or two seconds.

The invention is particularly applicable to model boats since when a boat is under way its inertia is such that reversal of the propeller shaft for only one or two seconds, while effective to bring about the desired movement, does not materially affect the progress of the boat through the water, and an observer has an impression of constant movement in either the forward or reverse direction.

In the application of the invention to a vehicle, there is a free-wheel device in the transmission, so that the driving wheels are not stopped when the shaft is reversed. Therefore the vehicle cannot be reversed. In this case also, if the drive is interrupted only for a very short period, the inertia of the vehicle will maintain the forward motion and the impression given to the observer will still be realistic.

The preferred constructions according to the invention will now be described with reference to the accompanying drawings, in which:

Figure 1 is a diagrammatic view of a model boat;

Figure 2 is a diagram showing the electrical connections in the boat;

Figure 3 shows part of the mechanism in one operating position;

Figure 4 is a view similar to Figure 3 with the part in another operating position; and Figure 5 is a diagrammatic view of a model motor car.

The model boat shown in Figure 1 contains a radio receiver 1 housed in a casing 2 and connected to a reversing switch 3 (Figure 2) which in turn is connected to a motor 4 also housed in the casing 2. The motor is driven by a battery 5. If a radio signal is received by the receiver 1 through an aerial 37 the switch 3 is reversed and the motor is reversed. This arrangement of a radio-controlled motor is well known.

The motor shaft is connected by reduction gearing 11 to a shaft 12, which in turn is connected through a coupling 13 to the shaft 14 of a propeller 15.

The boat has a rudder 16 with a shaft 17 in the form of a wire extending vertically upwards from the rudder through bearings 18, and bent twice at right angles, i. e. forwardly at 19 and then downwardly at 20, the downwardly extending part 20 being bent through 180° to form a loop 21. The interior of loop is the slot of a pin-and-slot connection to a control shaft 22 mounted parallel to the shaft 14 in bearings 23. The pin of the pin-and-slot connection is made by cranking the end of the control shaft 22 as shown at 24.

The control shaft 22 is connected to the propeller shaft 14 to be moved through 90° every time the motor is reversed. The connection between the propeller shaft 14 and the control shaft 22 includes a pinion 27 fixed on the propeller shaft, a toothed segment 28 freely mounted on the control shaft to be turned on that shaft by engagement with the pinion 27 when the propeller shaft is reversed, a pawl 26 carried by the segment 28, and a ratchet wheel 25 fixed on the shaft 22 for engagement by the pawl 26.

When the propeller shaft turns in the driving direction, shown by the arrow in Figure 3, the segment 28 carrying the pawl 26 hangs downwards with one corner lightly bearing against the pinion 27, which brushes against the corner of the segment 28 without positively engaging it. When, however, the propeller shaft 14 is reversed, the pinion 27 first engages the end tooth and then quickly turns the segment 28 through an angle of rather more than 90°. The pawl 26 is therefore carried through more than 90° and being pressed against the ratchet by a spring 29, turns the ratchet 25 through an angle corresponding to one ratchet tooth, i. e. 90°. The position of the parts is then as shown in Figure 4, in which the arrow indicates the reversed rotation of the shaft 14. As soon as the reversal of the propeller shaft 14 ceases and the shaft resumes its normal direction of motion, the segment 28 is returned to its zero position. It will be seen that the pinion 27 and segment 28 together form a device for moving the pawl 26 from a zero position every time the propeller shaft 14 is reversed and allowing it to return to the zero position when the propeller shaft 14 again turns in the driving direction.

A pawl 36 is provided to prevent backward rotation of the ratchet wheel 25.

By reason of the construction shown, the control shaft 22 is turned in one direction only, so that on each complete rotation of this shaft the rudder moves successively from the midship position to port, back through the midship position to starboard, and then to the midship position again.

The model motor car shown in Figure 5 works on essentially the same principle. The motor is connected to the driving axle 30 through a free-wheel device 31 so that the car is driven forwards so long as there is no signal and no drive is transmitted when the motor is reversed because of the receipt of a signal. The motor is geared to a shaft 32 which extends forwards to carry a pinion 27', and a control shaft 22', identical with the shaft 22, carries a segment 28' and is connected by a pin-and-slot connection 21', 24' to the steering axle 33, the loop 24' being fixed to a cross-bar 34 having arms 35 extending to the axle 33.

As shown in the drawings the angle through which the control shaft 22 or 22' is turned on each reversal of the motor is 90°, so that the rudder or steering axle has only three possible positions. This angle may, however, be smaller, giving more positions of the rudder or steering axle.

One advantage derived from the invention is that the motor can run at full speed except when it is reversed for steering purposes. Another advantage is that at all times the position of the rudder of a boat is always known, even though the rudder cannot be seen, since the position depends solely upon the number of times that the motor has been reversed. A further advantage in the case of a boat is that the boat can be driven in reverse, even though the steering depends upon the reverse rotation of the driving shaft.

I claim:

1. In a model of the class described with a free-wheel device in the transmission, the combination of a driving shaft, a reversible electric motor connected to drive said shaft, radio-controlled means for reversing the direction of rotation of said motor, a steering device, and a mechanism connected to said driving shaft and operative to move said steering device through a predetermined angle upon the reversal of said driving shaft for a short period.

2. A combination according to claim 1 in which said mechanism includes a control shaft turned through a predetermined angle each time the driving shaft is reversed, said control shaft being connected to the steering device through a pin-and-slot connection.

3. A combination according to claim 2 in which the control shaft carries a ratchet wheel engaged by a pawl, and a device operated by the driving shaft moves this pawl to turn the ratchet wheel when the driving shaft is reversed and allows the pawl to return to its initial position when the driving shaft again turns in the driving direction.

4. A combination according to claim 3 in which the device for moving the pawl is a segment carrying the pawl and engaged by a pinion on the driving shaft.

5. A model boat embodying, in combination, a propeller shaft, a reversible electric motor connected to drive said shaft, radio-controlled means for reversing the direction of rotation of said motor, a rudder, and a mechanism connected to said propeller shaft and operative to move said rudder through a predetermined angle upon the reversal of said propeller shaft for a short period.

References Cited in the file of this patent

UNITED STATES PATENTS

| | | |
|---|---|---|
| 259,221 | Selden | June 6, 1882 |
| 1,620,709 | Young | Mar. 15, 1927 |
| 2,488,464 | Arpin | Nov. 15, 1949 |